April 27, 1926.
S. KIELAR
1,582,521
RUBBER TIP FASTENING DEVICE
Original Filed Dec. 13, 1923
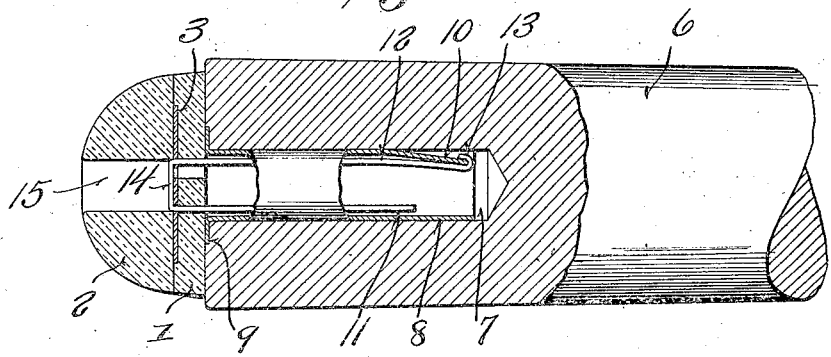
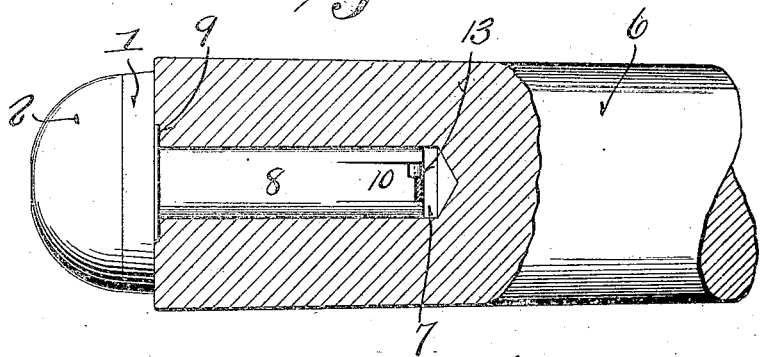
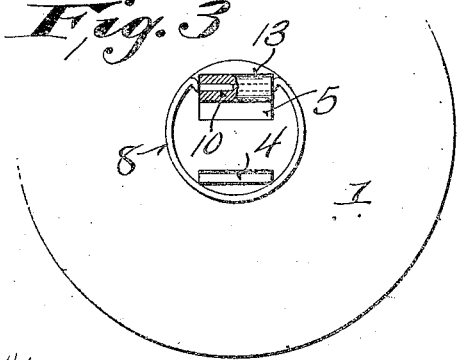 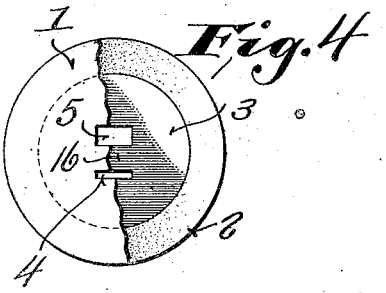
Inventor
Stanislaw Kielar Patented Apr. 27, 1926.

1,582,521

UNITED STATES PATENT OFFICE.

STANISLAW KIELAR, OF MILWAUKEE, WISCONSIN.

RUBBER-TIP-FASTENING DEVICE.

Application filed December 13, 1923, Serial No. 680,431. Renewed November 23, 1925.

*To all whom it may concern:*

Be it known that I, STANISLAW KIELAR, a citizen of the United States, and resident of Milwaukee, in the county of Milwaukee and State of Wisconsin, have invented certain new and useful Improvements in Rubber-Tip-Fastening Devices; and I do hereby declare that the following is a full, clear, and exact description thereof.

This invention relates to rubber tip fastening device.

Objects of this invention are to provide a fastening device for rubber tips which may be readily positioned upon billiard cues, chair legs or other places where it is desirable to have removable rubber tip so that such rubber tip may be quickly and easily replaced by a new tip, when it becomes worn, with a minimum of expense and effort.

An embodiment of the invention is shown in the accompanying drawings, in which:—

Figure 1 is an enlarged sectional view of the end of a cue showing the tip in position and in section.

Figure 2 is a view corresponding approximately to Figure 1, and being taken at right angles thereto.

Figure 3 is an enlarged view of the inner end of the fastening device such view indicating the outline of the cue.

Figure 4 is an inner face view of the rubber tip detached from the rest of the fastening device.

In practicing this invention a disk 1 of rubber is vulcanized to a rounded hemispherical portion 2 with a metallic plate 3 located between such portions. Preferably the portion 1 and the disk 3 are each provided with a pair of rectangular apertures 4 and 5 (see Figures 1 and 4), the aperture 5 being preferably larger than the aperture 4, as indicated, for a purpose hereinafter to appear.

The portion of the apparatus thus far described is the renewable or replaceable portion.

The tube 6 or similar member is bored out, as indicated at 7 and a metallic tube 8 is driven into place, such tube being provided with an outer flange 9 preferably being inset in the outer face of the tube. A portion of the inner end of the tube 8 is slotted to provide a resilient tongue 10 which is preferably sprung inwardly, as indicated in Figure 1, and is also cut off short of the inner end of the tube 8. A U-shaped spring is provided and is equipped with arms 11 and 12, the arm 12 being preferably of greater length than the arm 11 and being provided with an out-turned hook like end 13. The yoke portion 14 of the spring is preferably straight and joins the other portions by means of right angle bends.

When it is desired to position a rubber tip upon the cue 6, such tip is first associated with the spring by passing the arms 11 and 12 through the main aperture 15 in the portion 2 of the tip and, thereafter, passing such arms through the slots 4 and 5, the larger slot 5 permitting the hook-shaped end 13 to freely pass.

The spring is passed inwardly until the yoke portion 14 contacts with the web portion 16 of the disk (see Figures 1 and 4.) In this position the hook 13 is not in a position to engage the outer end of the tongue 10 but is located in close proximity thereto. Thereafter, the rubber tip is compressed a slight amount so as to cause the hook portion 13 to engage the outer end of the tongue, such tongue springing outwardly and interlocking with the hook 13.

It will be seen, therefore, the rubber tip may be most readily positioned in a simple and easy manner and that it will be securely retained in close contact with the outer end of the cue 6. When it is desired to remove the tip it is merely necessary to rotate it slightly with reference to the cue. This causes the hook 13 to slide off of the upper end of the tongue 10, and allows the spring and tip to be withdrawn.

Although in the detail description a cue has been referred to, it is, of course, to be understood that the invention is not limited to a rubber tip for a cue, but that the rubber tip may readily cooperate with any desired device whose end it is desired to cushion.

It will thus be seen that a removable rubber tip has been provided which is so constructed and is so associated with the securing means that it may be most readily replaced or removed, and it will further be seen that the portion of the device which is thrown away when it becomes worn constitutes a small part only of the device and consequently such renewal may be made with a minimum of expense.

Although the invention has been described in considerable detail, it is to be understood that the invention may be variously embodied and is, therefore, to be limited only as claimed.

I claim:

1. The combination of a member provided with a bored out portion, a tube positioned within said bored out portion and having slots in its inner end, said slots defining a tongue integrally formed with said tube, a rubber tip having an apertured disk embedded therein, and a U-shaped spring passing through the apertures in said disks and having a hooked end adapted to engage said tongue to lock said tip removably to said member.

2. The combination of a member having a bored out portion, a metallic tube position within said bored out portion, and having an integrally formed resilient tongue projecting towards its rear end, a removable rubber tip, a disk having a pair of spaced apertures therein, said disk being embedded within said tip and a removable U-shaped spring having projecting arms adapted to be passed through the apertures in said disk, such spring having a hooked end adapted to engage said resilient tongue.

In testimony that I claim the foregoing I have hereunto set my hand at Milwaukee, in the county of Milwaukee and State of Wisconsin.

STANISLAW KIELAR.